United States Patent [19]
Mollard et al.

[11] 4,096,080
[45] * Jun. 20, 1978

[54] SOLID SOLUTIONS OF MAGNETIC OXIDES AND METHOD OF PREPARATION

[75] Inventors: Paul Mollard, Isere; Jacques Paris; Abel Rousset, both of Rhone, all of France

[73] Assignee: Agence Nationale de Valorisation de la Recherche (ANVAR), Neuilly sur Seine, France

[*] Notice: The portion of the term of this patent subsequent to Mar. 25, 1992, has been disclaimed.

[21] Appl. No.: 622,573

[22] Filed: Oct. 15, 1975

Related U.S. Application Data

[63] Continuation-in-part of Ser. No. 427,674, Dec. 26, 1973, abandoned, which is a continuation-in-part of Ser. No. 269,838, Jul. 7, 1972, Pat. No. 3,873,461.

[51] Int. Cl.² .................................................. C04B 35/26
[52] U.S. Cl. .................................. 252/62.56; 252/62.6; 252/62.62; 252/62.64
[58] Field of Search ................ 252/62.56, 62.6, 62.62, 252/62.64

[56] References Cited

U.S. PATENT DOCUMENTS

| 2,882,236 | 4/1959 | Gorter et al. | 252/62.56 |
| 3,074,888 | 1/1963 | Carter | 252/62.56 X |
| 3,075,919 | 1/1963 | Gruber et al. | 252/62.56 X |
| 3,822,210 | 7/1974 | Iwase et al. | 252/62.56 X |
| 3,873,461 | 3/1975 | Mollard et al. | 252/62.56 |

FOREIGN PATENT DOCUMENTS

| 2,320,182 | 10/1973 | Germany. | |
| 688,769 | 3/1953 | United Kingdom | 252/62.56 |

*Primary Examiner*—Jack Cooper
*Attorney, Agent, or Firm*—Dowell & Dowell

[57] ABSTRACT

The invention concerns solid solutions of oxides of iron and of a divalent metal other than cobalt $Co^{2+}$ or, alternatively, of iron and of more than one divalent metal, including cobalt. Besides Co, the divalent metals may be Ni, Cu, Mn, Zn, Mg and Cd. Such solutions are prepared by precipitating a mixed oxalate containing iron and the other divalent metal or metals desired. This mixed oxalate is decomposed by heating it in open air at a progressively increasing temperature until carbon is eliminated but without forming rhomboedric oxide $\alpha$-$Fe_2O_3$. The pyrolyzed product is treated by hydrogen and steam at an elevated temperature to obtain a substituted magnetite, and this magnetite is oxidized in air at such a temperature as to avoid formation of $\alpha$-$Fe_2O_3$.

12 Claims, 5 Drawing Figures

| EX. | FORMULAS | | |
|---|---|---|---|
| 1 | $(\gamma\text{-}Fe_2O_3)_{0,827}$ | $(CoFe_2O_4)_{0,108}$ | $(ZnFe_2O_4)_{0,065}$ |
| 2 | " " | " " | " " |
| 3 | " " | " " | " " |
| 4 | $(\gamma\text{-}Fe_2O_3)_{0,778}$ | $(CoFe_2O_4)_{0,111}$ | $(ZnFe_2O_4)_{0,111}$ |
| 5 | " " | " " | " " |
| 6 | $(\gamma\text{-}Fe_2O_3)_{0,754}$ | $(CoFe_2O_4)_{0,112}$ | $(ZnFe_2O_4)_{0,134}$ |
| 7 | $(\gamma\text{-}Fe_2O_3)_{0,754}$ | $(CoFe_2O_4)_{0,112}$ | $(ZnFe_2O_4)_{0,134}$ |
| 8 | $(\gamma\text{-}Fe_2O_3)_{0,675}$ | $(CoFe_2O_4)_{0,116}$ | $(ZnFe_2O_4)_{0,209}$ |
| 9 | $(\gamma\text{-}Fe_2O_3)_{0,648}$ | $(CoFe_2O_4)_{0,117}$ | $(ZnFe_2O_4)_{0,235}$ |
| 10 | $(\gamma\text{-}Fe_2O_3)_{0,648}$ | $(CoFe_2O_4)_{0,235}$ | $(ZnFe_2O_4)_{0,117}$ |
| 11 | " " | " " | " " |
| 12 | $(\gamma\text{-}Fe_2O_3)_{0,562}$ | $(CoFe_2O_4)_{0,219}$ | $(ZnFe_2O_4)_{0,219}$ |
| 13 | " " | " " | " " |
| 14 | $(\gamma\text{-}Fe_2O_3)_{0,500}$ | $(CoFe_2O_4)_{0,250}$ | $(NiFe_2O_4)_{0,250}$ |
| 15 | $(\gamma\text{-}Fe_2O_3)_{0,500}$ | $(CoFe_2O_4)_{0,250}$ | $(MnFe_2O_4)_{0,250}$ |
| 16 | $(\gamma\text{-}Fe_2O_3)_{0,145}$ | $(CoFe_2O_4)_{0,285}$ | $(NiFe_2O_4)_{0,285}$ $(ZnFe_2O_4)_{0,285}$ |
| 17 | $(\gamma\text{-}Fe_2O_3)_{0,500}$ | $(CoFe_2O_4)_{0,250}$ | $(ZnFe_2O_4)_{0,250}$ |

*Fig. 1 A*

| EX. | TOTAL SUBST. | STEP (b) T° C | STEP (c) T°C | STEP (c) %H₂O | T°C UNDER VACUM | STEP (d) 72 hr T°C | MEAN SIZE (Å) | SATUR. MAGNET. 290 °K | COERC. FIELD 290° K |
|---|---|---|---|---|---|---|---|---|---|
| 1 | 0,08 | 300 | 310 | 20 | / | 280 | 380 | 76,5 | 670 |
| 2 | " | " | 340 | 30 | / | " | 500 | 78,6 | 715 |
| 3 | " | " | 310 | 20 | 450 | " | 840 | 79,85 | 590 |
| 4 | 0,10 | 320 | " | " | / | 300 | 480 | 75,8 | 575 |
| 5 | " | " | " | " | 450 | " | 1000 | 79,9 | 500 |
| 6 | 0,11 | " | 340 | 30 | / | " | 400 | 80,67 | 498 |
| 7 | " | " | 310 | 20 | 450 | " | 800 | 85,2 | 400 |
| 8 | 0,14 | " | 340 | 30 | / | " | 300 | 74,7 | 372 |
| 9 | 0,15 | " | 310 | 20 | 450 | " | 560 | 74,65 | 413 |
| 10 | " | " | " | " | / | " | 400 | 80 | 707 |
| 11 | " | " | " | " | 450 | " | 650 | 83,5 | 780 |
| 12 | 0,18 | 340 | " | " | / | 320 | 330 | 80,62 | 461 |
| 13 | " | " | " | " | 450 | " | 620 | 84,60 | 490 |
| 14 | 0,20 | 320 | 300 | 45 | " | 300 | 800 | 66,9 | 1118 |
| 15 | " | " | " | 20 | " | " | 560 | 71,6 | 1176 |
| 16 | 0,30 | 330 | " | " | 500 | 350 | 675 | 78,8 | 372 |
| 17 | 0,20 | 320 | 470 | 85 | | 300 | 700 | 88,6 | not measured |

*Fig. 1B*

SOLID SOLUTIONS OF MAGNETIC OXIDES AND METHOD OF PREPARATION

This application is a continuation-in-part of our earlier application Ser. No. 427,674, filed Dec. 26, 1973, now abandoned which was a continuation-in-part of our still earlier applicaion Ser. No. 269,838, filed July 7, 1972, now U.S. Pat. No. 3,873,461.

The present invention relates to solid solutions of oxides of iron and of other divalent metals.

The solid solutions described in our previous patent application Ser. No. 269,838, now U.S. Pat. No. 3,873,461, only contain a single divalent metal other than iron and this metal is cobalt $Co^{2+}$. It has been discovered that in some instances it could be of advantage to prepare solid solutions of iron and of a divalent metal other than iron and cobalt, also that the solid solutions could conveniently contain more than a single divalent metal other than iron, including cobalt.

In the case of a single metal other than iron and cobalt, a solid solution according to the present invention may be represented as follows:

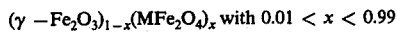
$$(\gamma-Fe_2O_3)_{1-x}(MFe_2O_4)_x \text{ with } 0.01 < x < 0.99$$

in which M represents a divalent metal other than iron and cobalt, the ions of which are compatible with the spinel lattice, such as nickel, copper, manganese, zinc, magnesium and cadmium.

According to another aspect of the invention the solid solution may be:

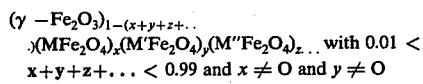
$$(\gamma-Fe_2O_3)_{1-(x+y+z+\ldots)}(MFe_2O_4)_x(M'Fe_2O_4)_y(M''Fe_2O_4)_z\ldots$$
with $0.01 < x+y+z+\ldots < 0.99$ and $x \neq 0$ and $y \neq 0$ and with M, M', M" designating divalent metals other than iron such as cobalt, nickel, copper, manganese, zinc, magnesium and cadmium.

When the solution contains iron and two other divalent metals, it may be considered as of the ternary type (z and all the following indexes being equal to zero). If the third index z is different from zero, the following ones being equal to zero, the solution is of the quaternary type, etc. . .

Since $\gamma$-$Fe_2O_3$ is a defect spinel oxide (spinel oxide with vacancies), its solutions may be considered as defect ferrites with variable vacancy proportion in accordance with the number of substituted $M^{2+}$ ions. The substitution is effected according to the formula:

$$2 Fe^{3+} + \square \rightarrow 3M^{2+}$$

The divalent metals other than iron may be selected in accordance with the properties desired for the final product. Thus for instance if the substitution of $Co^{2+}$ ions for $Fe^{3+}$ ions in iron oxide $\gamma$-$Fe_2O_3$ determines a substantial increase in the coercive field, the presence in this oxide of diamagnetic ions, such as for instance $Zn^{2+}$, located in tetrahedral site, acts favourably on the value of the saturation magnetization. Also the coefficient of magnetostriction may be decreased by ions such as $Ni^{2+}$ or $Mn^{2+}$. It is therefore possible, by preparing solid solutions containing a number of these divalent metals, to obtain magnetic products having properties which correspond more closely to the requirements of each particular case.

The operative steps for the preparation of the solid solutions according to the invention are similar to those disclosed in the aforesaid prior U.S. patent applications, but the various operating temperatures and the $H_2O$ content of the hydrogen atmosphere used for the third step may generally be increased. Also if ammonium oxalate is practically the most convenient compound for the initial preparation of the mixed oxalates, it should be noted that it may be of advantage in some cases to use other oxalic media, such as sodium oxalate, or even oxalic acid itself.

The invention will be more easily understood with reference to the accompanying drawings wherein:

FIG. 1 is a table showing the parameters used in the preparation of a number of different ferrites according to the invention and the properties of the products obtained;

Figure 3:
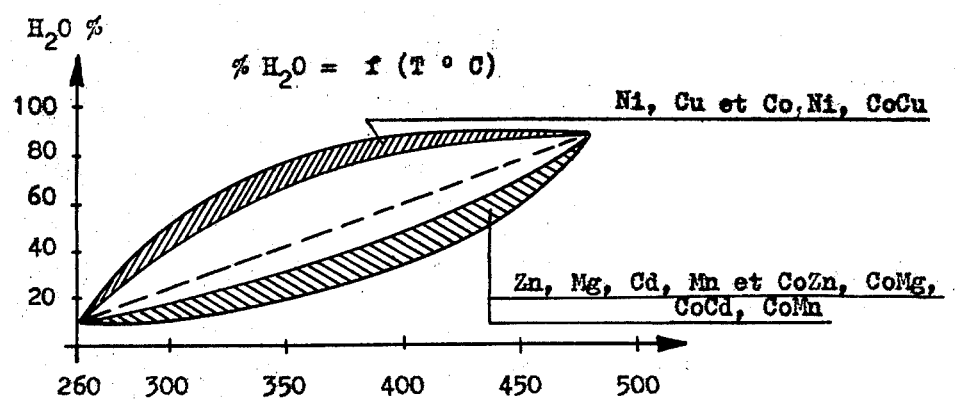
Figure 4:
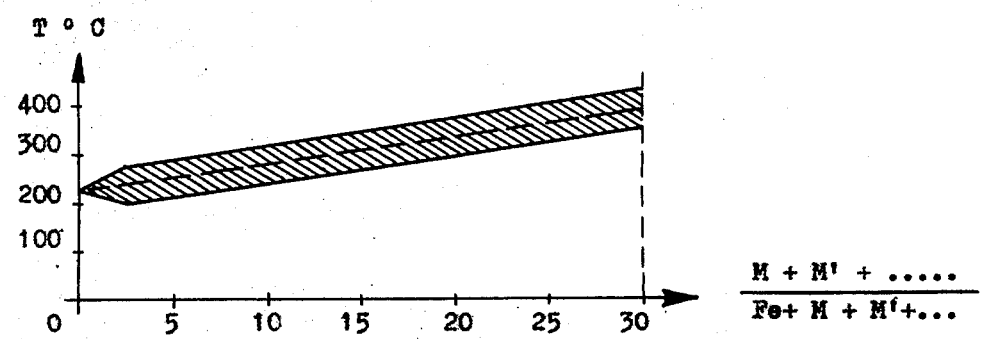

FIG. 3 is a graphical showing of the manner of selecting the proportion of steam present in the hydrogen atmosphere for different temperature in the magnetite substitution step (step c); and FIG. 4 is a graphical showing of the manner of selecting the maximum temperature to be used in the oxidizing step (step d) for different proportions of the divalent substitution metal or metals to the bulk of the sample.

The ferrites which appear in FIG. 1 are typical of the solid solutions which may be prepared according to the present invention and which are of interest more particularly for the manufacture of magnetic tapes and the like. This table shows the general conditions prevailing during the preparation of the samples and the most important parameters of the products obtained. These products are metastable ferrites with vacancies which are solid solutions derived from metastable iron sesquioxide by substituting for some of the $Fe^{3+}$ ions and for some of the vacancies one of the divalent metals taken from the group consisting of Zn, Mn, Ni, Cu, Mg, and Cd. Where said substituted divalent group is diamagnetic and is taken from the sub-group Zn and Cd, the substitution is in tetrahedric sites of the crystallite structure and produces at 290° K saturation magnetization higher than 73 e.m.u./g. Other products are derived from metastable iron sesquioxide by substituting for some of the $Fe^{3+}$ ions and for some of the vacancies more than one of the divalent metals of the group consisting of Co, Zn, Mn, Ni, Cu, Mg, and Cd. Where said substitute divalent metals are Co and a diamagnetic metal of the sub-group consisting of Zn and Cd, the substitution is in tetrahedric sites of the crystallite structure, and produces at 290° K saturation magnetization higher than 73 e.m.u./g with a coercive field at 290° K higher than 250 Oe.

As explained in the aforesaid prior U.S. patent applications, the first operative step or step (a) consists in preparing by co-precipitation a water insoluble mixed oxalate containing $Fe^{2+}$ ions and ions of a divalent metal taken from the group consisting of Zn, Mn, Ni, Cu, Mg and Cd, or as an alternative ions of more than one divalent metal of the group consisting of Co, Zn, Mn, Ni, Cu, Mg and Cd. In a preferred embodiment this is obtained by adding an oxalic compound to a mixture of chlorides of the metals selected, the oxalic compound being conveniently ammonium oxalate or oxalic acid.

Figure 2:
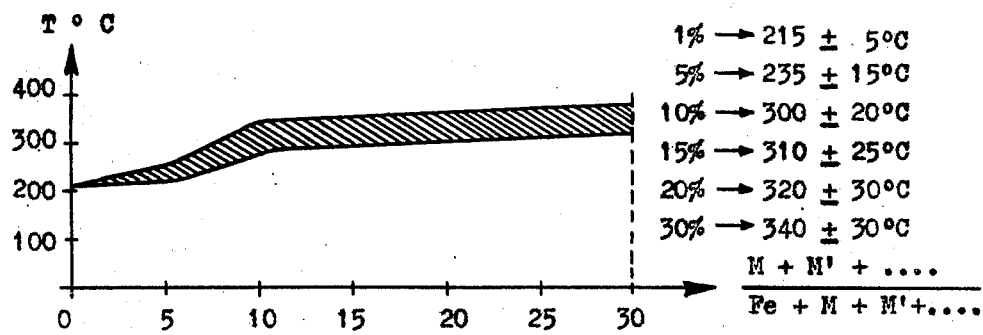
FIG. 2 is a graphical showing of the manner of selecting the upper temperature to be reached during the decomposition step (step b) for different proportions of the divalent substitution metal or metals to the bulk of a sample.

During the second step, or step b, the mixed oxalate is decomposed by pyrolysis in air or other oxygen-containing gas. The temperature is preferably progressively increased, a convenient temperature gradient being 150° C/hr. This heating step should be stopped when substantially all the carbon resulting rom the decomposition of the oxalate is eliminated as $CO_2$, but before any formation of rhomboedric iron oxide $\alpha$-$Fe_2O_3$. The presence of residual carbon is easily detected by conventional $CO_2$ analyzers; as to the detection of $\alpha$-$Fe_2O_3$, it may be realized by X-rays in a well-known manner. But referring to FIG. 2, the cross-hatched area situated between the curves indicates a zone within which the above conditions are fulfilled for different amounts of divalent metal or metals other than iron, when increasing the temperature with a gradient of 150° C/hr, starting from room temperature. The curves of FIG. 2 thus dispense with the need to conduct preliminary tests to determine the temperature to be selected in each case. As shown the temperature limit increases with the content in metal or metals other than iron. The curves of FIG. 2 are not quite critical in that sense the in some particular cases, or with other temperature gradients, the heating limit may be higher or lower. But then preliminary tests should be made to be sure that the conditions required are fulfilled.

The third step, or step (c), consists in heating the pyrolyzed product in an atmosphere of hydrogen containing water vapour. The parameters (temperature, steam content and duration of the heating step) should be such as to produce a substituted magnetite without any residual carbon and without any iron under metallic form. The substituted magnetite is formed of crystallites having an average size of more than 200 Å. The proportion of steam used in this step will be between 7% and 90% by volume, and the temperature will be between 260° and 480° C, the percentage of steam selected for inclusion in the hydrogen atmosphere increasing with said temperature. Here again the cross-hatched areas of FIG. 3 permit of selecting the temperature and water content for a heating time of 7 hours, without having to effect preliminary tests. These curves correspond to the relation between the heating temperature and the water content of the hydrogen atmosphere. The upper zone corresponds to the presence of Ni and/or Cu and the lower one to the other substitution metals. As an optional step, prior to the fourth step (d), the magnetite can be heated in a vacuum to a temperature within the range of 280° C to 450° C to increase the size of the crystallites, as recited in some of the EXAMPLES below.

The fourth and last step (step d) consists in heating the substituted magnetite in air or other oxygen-containing gas to oxidize same. It is convenient to progressively increase the temperature from about room temperature with a gradient of 150° C/hr up to a limit temperature between 210° and 380° C, the maximum temperature selected increasing within said temperature range as the proportion of divalent metals to iron increases in the magnetite, the selected maximum temperature being maintained during about 72 hours. This limit should be such that no $\alpha$-$Fe_2O_3$ is formed. It increases almost linearly with the content in substitution metal or metals. The cross-heatched area in FIG. 4 shows a safe zone wherein this condition is fulfilled without having to proceed to preliminary tests.

Some detailed examples are given below:

EXAMPLE A

The cubic solid solution to be obtained is:

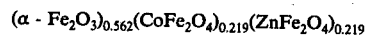

$(\alpha$-$Fe_2O_3)_{0.562}(CoFe_2O_4)_{0.219}(ZnFe_2O_4)_{0.219}$

The first step includes the preparation of the following mixed oxalate:

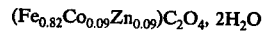

$(Fe_{0.82}Co_{0.09}Zn_{0.09})C_2O_4, 2H_2O$

This oxalate precipitates when a solution containing a mixture of MOHR's salt, cobalt chloride and zinc chloride is treated with a slight excess of ammonium oxalate. The precipitate is washed in distilled water, dried at room temperature, and then decomposed by heating in open air at a temperature of 340° C, the initial temperature being increased at a rate of 150° C per hour. The residue of this pyrolysis is submitted for 7 hours at 310° C to the action of an atmosphere of hydrogen containing 20% in volume of steam, which permits of obtaining a magnetite substituted by cobalt and zinc, namely:

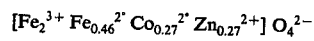

$[Fe_2^{3+} Fe_{0.46}^{2+} Co_{0.27}^{2+} Zn_{0.27}^{2+}] O_4^{2-}$ in crystallites of 350 Å.

This substituted magnetite is then oxidized by heating in open air, the temperature being increased at a rate of 150° C per hour up to 320° C, and it is thus treated for 72 hours. There is finally obtained the desired spinel type cubic solution:

$(\alpha$-$Fe_2O_3)_{0.562}(CoFe_2O_4)_{0.219}(ZnFe_2O_4)_{0.219}$ the characteristics of which are as follows:
Crystalline parameter: a = 8.390 Å
Average size of the crystallites: 350 Å
Saturation magnetization at 290° K: $\sigma$ = 80.62 e.m.u./g
Coercive field at 290° K: $H_c$ = 461 Oe These characteristics may be compared with those:
1° of the iron oxide $\gamma$-$Fe_2O_3$:
Crystalline parameter: a = 8.346 Å
Average size of the crystallites: 500 Å
Saturation magnetization at 290° K: $\sigma$ = 73 e.m.u./g
Coercive field at 290° K: Hc = 230 Oe 2° of the solid solution $(\gamma$-$Fe_2O_3)_{0.522}(CoFe_2O_4)_{0.478}$, i.e. of a solution containing substantially the same proportion of divalent ions other than iron, but in which these ions are only comprised of cobalt:
Crystalline parameter: a = 8.368
Average size of the crystallites: 270 Å
Saturation magnetization at 290° K: $\sigma$ = 65 e.m.u./g
Coercive field at 290° K: Hc = 1100 Oe 3° of the solid solution $(\gamma$-$Fe_2O_3)_{0.786}(CoFe_2O_4)_{0.214}$, i.e. of a solution containing substantially the same proportion of cobalt:
Crystalline parameter: a = 8.358 Å
Size of the crystallites: 320 Å
Saturation magnetization at 290° K: $\sigma$ = 65 e.m.u./g
Coercive field at 290° K: Hc = 1600 Oe It is to be noted that this detailed example A corresponds to line 12 of FIG. 1.

EXAMPLE B

The solid solution to be obtained is the same as in Example A, namely:

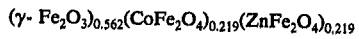

$(\gamma$-$Fe_2O_3)_{0.562}(CoFe_2O_4)_{0.219}(ZnFe_2O_4)_{0.219}$ but it is desired that the crystallites should be of larger size.

For this purpose there is first prepared the same substituted magnetite as in Example A:

$$[Fe_2^{3+} Fe_{0.46}^{2+} Co_{0.27}^{2+} Zn_{0.27}^{2+}] O_4^{2-}$$

in crystallites of 350 Å, as indicated in that example. But before oxidizing this magnetite in open air, it is maintained at room temperature for 24 hours under a vacuum of $10^{-5}$ mm Hg, and thereafter it is heated at 450° C for 24 hours while being still under this vacuum. In the magnetite thus treated the size of the crystallites has increased up to 620 Å. The magnetite is therefore oxidized as in Example A and there is finally obtained the same solid solution:

$$(\gamma\text{-}Fe_2O_3)_{0.562}(CoFe_2O_4)_{0.219}(ZnFe_2O_4)_{0.219}$$

but with the following characteristics:
Crystalline parameter: a = 8.390 Å
Average size of the crytallites: 620 Å
Saturation magnetization at 290° K: $\sigma$ = 84,6 e.m.u./g
Coercive field at 290° K: Hc = 490 Oe
This example B corresponds to line 13 of FIG. 1.

EXAMPLE C

The cubic solid solution to be obtained is:

$$(\gamma\text{-}Fe_2O_3)_{0.344}(CoFe_2O_4)_{0.400}(ZnFe_2O_4)_{0.266}$$

There is first prepared a mixed oxalate:

$$(Fe_{0.75}Co_{0.15}Zn_{0.10})C_2O_4, 2H_2O$$

This oxalate precipitates when a solution containing an appropriate mixture of MOHR's salt, cobalt chloride and zinc chloride is treated with a slight excess of ammonium oxalate. The precipitate is washed in distilled water, dried at room temperature, and then decomposed by heating in air at a temperature of 300° C, the initial temperature being increased at a rate of 150° C per hour. The residue of this pyrolysis is submitted for 7 hours to the action at 300° C of a hydrogen atmosphere obtaining 10% in volume of steam, which permits of obtaining a cobalt and zinc substituted magnetite:

$$[Fe_2^{3+} Fe_{0.25}^{2+} Co_{0.45}^{2+} Zn_{0.30}^{2+}] O_4^{2-}$$

in crystallites of 250 Å.
In order to increase the size of the crystallites for having the best magnetic properties, this magnetite is first submitted to a vacuum of $10^{-5}$ mm Hg for 24 hours at room temperature, and then at 500° C for also 24 hours. Under these conditions the threated magnetite is in the form of crystallites of 800 Å.
This magnetite is then oxidized in air by being heated progressively, with a rate of 150° C per hour, up to 300° C at which temperature it is maintained for 72 hours.
There is thus obtained the above mentioned defect spinel type ternary cubic solution, the characteristics of which are as follows:
Crystalline parameter: a = 8.390 Å
Average size of the crystallites: 800 Å
Transformation temperature with a temperature gradient of 600° C/h; 750° C
Saturation magnetization at 290° K: $\sigma$ = 91 e.m.u./g
Remanent magnetization at 290° K: $\sigma$ = 30 e.m.u./g
Coercive field at 290° K: $H_c$ = 462 Oe The next example concerns a binary solid solution including iron and zinc, i.e. a/divalent metal other than cobalt.

EXAMPLE D

The cubic solution to be obtained is now:

$$(\gamma\text{-}Fe_2O_3)_{0.78}(ZnFe_2O_4)_{0.22}$$

There is first prepared a mixed oxalate:

$$(Fe_{0.90}Zn_{0.10})C_2O_4, 2H_2O$$

which precipitates when a solution containing in appropriate proportions MOHR's salt and zinc chloride is treated with a slight excess of ammonium oxalate. The precipitate is washed in distilled water, dried at room temperature, and then decomposed in air at 300° C, the initial temperature being progressively increased at a rate of 150° C per hour. The residue of the pyrolysis is thereafter threated for 7 hours in a hydrogen atmosphere containing 50% in volume of steam ($H_2O$) at a temperature of 440° C. There is thus obtained a zinc substituted magnetite:

$$[Fe_2^{3+} Fe_{0.70}^{2+} Zn_{0.30}^{2+}] O_4^{2-}$$

in crystallites of 260 Å.
This magnetite is then oxidized in air by being progressively heated at a rate of 150° C/h up to 300° C at which temperature it is maintained during 72 hours.
There is thus obtained the desired defect spinel type binary cubic solution, the characteristics of which are as follows:
Crystalline parameter: a = 8.371 Å
Average size of the crystallites: 800 Å
Transformation temperature with a temperature gradient of 600° C/h: 600° C
Saturation magnetization at 290° K: $\sigma$ = 80.2 e.m.u./g
Remanent magnetization at 290° K: $\sigma$ = 20.34 e.m.u./g
Coercive field at 290° K: $H_c$ = 129 Oe
According to the following expression which is of a form that has been developed or expanded to show the vacancies as well as the ions, the product obtained may be considered as corresponding to the formula:

$$Fe_{2.175}^{3+} Zn_{0.825}^{2+} [Fe_{5.275}^{3+} \square_{0.725}] O_{12}^{2-}$$

while the developed formula of $\gamma\text{-}Fe_2O_3$ is:

$$Fe_3^{3+}][Fe_5^{3+}\square] O_{12}^{2-}$$

EXAMPLE E

The solid solution to be obtained is:

$$(\gamma\text{-}Fe_2O_3)_{0.500}(NiFe_2O_4)_{0.500}$$

There is first prepared a mixed oxalate $(Fe_{0.80}Ni_{0.20})C_2O_4, 2H_2O$ by proceeding as in the previous example. This oxalate is decomposed by being heated in air at a rate of 150° C per hour up to 350° C. The pyrolyzed product is treated during 7 hours at 400° C in a hydrogen atmosphere containing 80% in volume of steam, which results in the substituted magnetite $[Fe_2^{3+} Fe_{0.40}^{2+} Ni_{0.60}^{2+}] O_4^{2-}$ in the form of crystallites of 200 Å. This magnetite is then oxidized by being heated in air at a rate of 150° C per hour up to 220° C during 72 hours. This results in the above-mentioned solid solution, the characteristics of which are:

crystalline parameter a = 8.349 Å
average size of the substantially spherical crystallites: 200 Å
transformation temperature in dynamic regime (temperature gradient 600° C/hr)

$T_f = 640°$ C saturation magnetization at 290° K: $\sigma = 51.2$ e.m.u./g

EXAMPLE F

The cubic solid solution of the defect spinel type to be obtained is:

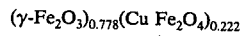

There is first prepared a mixed oxalate ($Fe_{0.90}Cu_{0.10}$)$C_2O_4$, $2H_2O$ which precipitates when a solution containing a mixture of appropriate proportions of ferrous iron chloride and of cupric copper chloride is treated with a slight excess of oxalic acid. The precipitate is washed in distilled water, dried at room temperature and then decomposed by being heated in air at a rate of 150° C per hour up to 250° C. The pyrolyzed product is thereafter heated for 7 hours at 300° C in a hydrogen atmosphere containing 45% in volume of steam. There is thus obtained a copper substituted magnetite:

$[Fe_2^{3+} Fe_{0.70}^{2+} Cu_{0.30}^{2+}] O_4^{2-}$ in crystallites of 410 Å. The oxidation of this substituted magnetite effected by heating it in air at a rate of 150° C per hour up to 250° C and during 72 hours results in the above-mentioned solid solution, the characteristics of which are as follows:

crystalline parameter a = 8.355 Å
average size of the substantially spherical crystallites: 410 Å
transformation temperature in dynamic regime (temperature gradient 600° C/hr)

$T_f = 530°$ C saturation magnetization at 290° K: $\sigma = 61.3$ e.m.u./g

EXAMPLE G

The cubic solid solution of the defect spinel type to be obtained is:

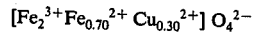

There is first prepared a mixed oxalate ($Fe_{0.95}Mg_{0.05}$)$C_2O_4$, $2H_2O$. This salt precipitates when a solution containing a mixture of appropriate proportions of ferrous iron chloride and magnesium sulphate is treated with a slight excess of oxalic acid. The precipitate is washed in distilled water, dried and decomposed by being heated in air at a rate of 150° C per hour up to 235° C. The pyrolyzed product is then treated during 7 hours at 260° C in a hydrogen atmosphere containing 7% in volume of steam, which permits of obtaining a magnesium substituted magnetite ($Fe_2^{3+}$ $Fe_{0.90}^{2+}$ $Mg_{0.10}^{2+}$) $O_4^{2-}$ in the form of crystallites of 450 A. The oxidation of this substituted magnetite in air by heating same at a rate of 150° C per hour up to 300° C and during 72 hours yields the desired solid solution the characteristics of which are:

crystalline parameter a = 8.356 Å
average size of the substantially spherical crystallites: 450 Å
transformation temperature in dynamic regime (temperature gradient 600° C/hr) $T_f = 490°$ C
saturation magnetization at 290° K: $\sigma = 29$ e.m.u./g

EXAMPLE H

In order to prepare the ternary solid cubic solution of the defect spinel type:

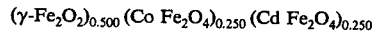

there is first prepared the mixed oxalate ($Fe_{0.80}Co_{0.10}Cd_{0.10}$) $C_2O_4$, $2H_2O$ which precipitates when a solution containing a mixture of appropriate proportions of Mohr salt, cobalt chloride and cadmium chloride is treated with a slight excess of oxalic acid. The precipitate is washed in distilled water, dried at room temperature and decomposed by being heated in air at a rate of 150° C per hour up to 320° C. The pyrolyzed product is then treated at 310° C for 7 hours in a hydrogen atmosphere containing 20% in volume of steam, which permits of obtaining the cobalt and cadmium substituted magnetite $[Fe_2^{3+}Fe_{0.40}^{2+} Co_{0.30}^{2+} Cd_{0.30}^{2+}]O_4^2$ in the form of crystallites of 210 Å. This magnetite is then oxidized by being heated in air at a rate of 150° C per hour up to 350° C, the heating step lasting 72 hours. There is thus obtained the desired solid solution the characteristics of which are:

crystalline parameter a = 8.36 Å
average size of the substantially spherical crystallites: 210 Å
transformation temperature in dynamic regime (temperature gradient 600° C/hr)

$T_f = 610°$ C saturation magnetization at 290° K: $\sigma = 65.43$ e.m.u./g

EXAMPLE I

The ternary solid cubic solution of the defect spinel type to be obtained is:

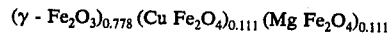

Here again there is first prepared a mixed oxalate ($Fe_{0.90}Cu_{0.05}Mg_{0.05}$)$C_2O_4$, $2H_2O$ which precipitates when a solution containing a mixture of appropriate proportions of ferrous iron chloride, cupric copper chloride and magnesium sulphate is treated with a slight excess of oxalic acid. The precipitate is washed in distilled water, dried at room temperature and then decomposed by being heated in air at a rate of 150° C per hour up to 300° C. The pyrolyzed product is thereafter treated at 300° C during 7 hours in a hydrogen atmosphere containing 30% in volume of steam, which results in the copper and magnesium substituted magnetite $[Fe_2^{3+} Fe_{0.70}^{2+} Cu_{0.15}^{2+} MG_{0.15}^{2+}] O_4^{2-}$ in the form of crystallites of 430 A. This magnetite is then oxidized by being heated in air at a rate of 150° C per hour up to 300° C, the treatment lasting 72 hours. There is thus obtained the desired solid solution the characteristics of which are:

crystalline parameter a = 8.361 Å
average size of the substantially spherical crystallites: 430 Å
transformation temperature in dynamic regime (temperature gradient 600° C/hr)

$T_f = 540°$ C saturation magnetization at 290° K $\sigma = 65.4$ e.m.u./g

Referring to the preceeding examples, it may be of advantage to have a certain proportion of iron in the $Fe^{2+}$ form in the finished product since this may have a favourable influence on certain magnetic properties thereof. This is easily obtainable:

either by reducing the temperature and the operating time during the last step (oxidation of the substituted magnetite);

or by submitting the final product to an additional reducing step during a short time and at a reduced temperature.

For instance in any of the preceding examples, the last step could be carried at a temperature below 200° C and during two hours or even less.

The products obtained according to the invention are true solid solutions and not merely intimate mixtures of $\gamma$-$Fe_2O_3$ and of ferrites of other divalent metals.

Considering for instance the solid solution:

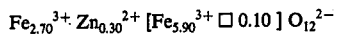

which is somewhat similar to the solution of example D above, and the mixture:

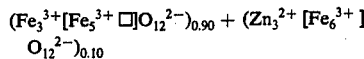

both have the same relative proportions of iron and zinc and both are magnetic. But in fact they are widely different from each other.

(1°) The solution is clear reddish, while the mixture is brown.

(2°) The magnetic moments at saturation, as determined by Neel's formula are respectively:

for the solution: 16 $\mu$B (Bohr's Magneton)
for the mixture: 9 $\mu$B
which corresponds to a considerable difference.

(3°) The transformation temperatures are respectively:

for the solution: 600° C
for the mixture: 480° C

This demonstrates that the solid solutions obtained according to the invention are widely different from the mixtures of the prior art and have widely different properties.

Among these solid solutions those containing zinc or zinc and cobalt are of particular interest for the manufacture of magnetic tapes and the like.

We claim:

1. A method for the preparation of a metastable solid solution ferrite of defect spinel structure having vacancies, which is derived from mestastable iron sesquioxide $\gamma$-$Fe_2O_3$ by substituting for some of the $Fe^{3+}$ ions and for some of the vacancies a divalent metal M taken from the group consisting of Zn, Mn, Ni, Cu, Mg and Cd, the solid solution being binary and having the formulation:

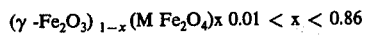

the method comprising the following steps:

(a) preparing by co-precipitation a water insoluble mixed oxalate containing $Fe^{2+}$ ions and divalent ions of one of the divalent metals of said group, said mixed oxalate corresponding to the formula:

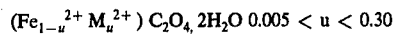

wherein the value of u is such that the proportion of said divalent metal with respect to iron in the said oxalate is the same as the proportion thereof in the said solid solution;

(b) heating uniformly and progressively said mixed oxalate in an oxygen containing gas to a temperature selected from within the cross-hatched area of FIG. 2 according to the proportion of divalent metal to iron plus divalent metal, and continuing the heating step until said oxalate is decomposed and most of the resultant carbon is eliminated, this heating step being stopped before formation of rhombohedric oxide $\gamma$-$Fe_2O_3$ is effected;

(c) heating the product of step (b) in a steam containing hydrogen atmosphere to produce a substituted magnetite formed of crystallites having an average size of more than 200 Å and free from residual carbon and from metallic iron, the proportion of steam being between 7% and 90% by volume and the temperature being between 260° C and 480° C, the percentage of steam selected for inclusion in the hydrogen atmosphere increasing with said temperature;

(d) and heating said substituted magnetite in an oxygen containing gas to oxidize same at a temperature selected from within the cross-hatched area of FIG. 4 according to the proportion of divalent metal to iron plus divalent metal, this heating step being stopped before formation of rhombohedric $\alpha$-$Fe_2O_3$ is effected.

2. The method as claimed in claim 1, wherein said water-insoluble mixed oxalate is heated during step (b) with a temperature gradient of substantially 150° C per hour.

3. The method as claimed in claim 1, wherein prior to step (d) said substituted magnetite formed in step (c) is heated under vacuum at a temperature between 280° and 450° C to increase the dimension of said crystallites before submitting said magnetite to step (d).

4. The method as claimed in claim 1, wherein said substituted magnetite is heated during step (d) for substantially 72 hours.

5. A metastable ferrite with vacancies which is the product of the process defined in claim 1.

6. A metastable ferrite with vacancies which is the product of the process as claimed in claim 1, wherein said metal M is diamagnetic and selected from the subgroup consisting of Zn and Cd and is in tetrahedral sites, with the situation magnetization at 290° K being higher than 73 e.m.u./g.

7. A method for the preparation of a metastable solid solution ferrite of defect spinel structure having vacancies, which is derived from metastable iron sesquioxide $\gamma$-$Fe_2O_3$ by substituting for some of the $Fe^{3+}$ ions and for some of the vacancies more than one divalent metal M taken from the group consisting of Co, Zn, Mn, Ni, Cu, Mg and Cd, the solid solution having the formulation:

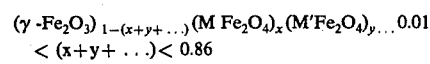

the method comprising the following steps:
(a) preparing by co-precipitation a water insoluble mixed oxalate containing $Fe^{2+}$ ions and divalent ions of more than one divalent metal of said group, said mixed oxalate corresponding to the formula:

$$(Fe_{1-(u+v+\ldots)}^{2+} M_u^{2+} M'hd\ v\ldots^{2+}) C_2O_4, 2H_2O$$
$$0.005 < (u+v+\ldots) < 0.30$$

where the value of $u$, $v$, ... is such that the aggregate proportion of the divalent metals to iron in the said oxalate is the same as the proportion thereof in the said solid solution;

(b) heating uniformly and progressively said mixed oxalate in an oxygen containing gas to a temperature selected from within the cross-hatched area of FIG. 2 according to the proportion of divalent metals to iron plus divalent metals, and continuing the heating step until said oxalate is decomposed and most of the resultant carbon is eliminated, this heating step being stopped before formation of rhombohedric oxide $\alpha\text{-}Fe_2O_3$ is effected;

(c) heating the product of step (b) in a steam containing hydrogen atmosphere to produce a substituted magnetite formed of crystallites having an average size of more than 200 Å and free from residual carbon and from metallic iron, the proportion of steam being between 7% and 90% by volume and the temperature being between 260° and 480° C, and the percentage of steam selected for inclusion in the hydrogen atmosphere increasing with said temperature;

(d) and heating said substituted magnetite in an oxygen containing gas to oxidize same at a temperature selected from within the cross-hatched area of FIG. 4 according to the proportion of divalent metals to iron plus divalent metals, this heating step being stopped before formation of rhombohedric $\alpha\text{-}Fe_2O_3$ is effected.

8. The method as claimed in claim 7, wherein said water-insoluble mixed oxalate is heated during step (b) with a temperature gradient of substantially 150° C per hour.

9. The method as claimed in claim 7, wherein prior to step (d) said substituted magnetite formed in step (c) is heated under vacuum at a temperature between 280° and 450° C to increase the dimension of said crystallites before submitting said magnetic to step (d).

10. The method as claimed in claim 7, wherein said substituted magnetite is heated during step (d) for substantially 72 hours.

11. A metastable defect ferrite with vacancies which is the product of the process defined in claim 7.

12. A metastable defect ferrite with vacancies which is the product of the process as claimed in claim 7, wherein said metals M consist of Co and of one diamagnetic metal M of the sub-group consisting of Zn and Cd which are in tetrahedral sites, the resulting product having a saturation magnetization at 290° K higher than 73 e.m.u./g and a coercive field at 290° K higher than 250 Oe.

* * * * *